United States Patent
Lin et al.

[11] Patent Number: 5,866,051
[45] Date of Patent: Feb. 2, 1999

[54] METHOD OF MAKING CONTINUOUS GLASS FIBER-REINFORCED THERMOPLASTIC FOAM SANDWICH COMPOSITES

[75] Inventors: Chin-I Lin, Tainan Hsien; Shyn-Yang Lee, Hsinchu; Chun-Chin Chen, Chu-Pei; Teng-Soung Tong, Hsinchu, all of Taiwan

[73] Assignee: Industrial Technology Research Institute, Hsinchu, Taiwan

[21] Appl. No.: 839,030

[22] Filed: Apr. 23, 1997

[51] Int. Cl.[6] .......................... B29C 44/06; B29C 44/12; B29C 70/52; B29C 47/04
[52] U.S. Cl. ..................... 264/45.9; 156/244.22; 264/46.5; 264/173.11; 264/173.12; 264/258; 264/271.1
[58] Field of Search ................... 264/258, 46.5, 264/45.9, 45.8, 173.11, 173.12, 261, 271.1; 156/180, 244.22

[56] References Cited

U.S. PATENT DOCUMENTS

| | | | |
|---|---|---|---|
| 3,993,726 | 11/1976 | Moyer | 264/174 |
| 4,130,614 | 12/1978 | Saidla | 264/46.4 |
| 4,154,634 | 5/1979 | Shobert et al. | 264/258 |
| 4,372,900 | 2/1983 | Doerfling | 264/258 |
| 4,386,983 | 6/1983 | Hipchen et al. | 264/45.8 |
| 4,439,387 | 3/1984 | Hawley | 264/108 |
| 4,581,186 | 4/1986 | Larson | 264/261 |
| 4,842,667 | 6/1989 | Thorsted, Jr. | 264/258 |
| 4,861,621 | 8/1989 | Kanzaki | 156/180 |
| 4,938,823 | 7/1990 | Balazek et al. | 156/166 |
| 5,043,128 | 8/1991 | Umeda | 264/258 |
| 5,080,850 | 1/1992 | Holloway | 264/258 |
| 5,120,380 | 6/1992 | Strachan | 156/180 |
| 5,275,776 | 1/1994 | Hara et al. | 264/258 |
| 5,277,566 | 1/1994 | Augustin et al. | 425/114 |
| 5,286,320 | 2/1994 | McGrath et al. | 156/83 |
| 5,342,469 | 8/1994 | Bodford et al. | 156/244.22 |
| 5,653,923 | 8/1997 | Spoo et al. | 264/46.6 |
| 5,665,295 | 9/1997 | Takamoto et al. | 264/258 |
| 5,783,013 | 7/1998 | Beckman et al. | 156/180 |

*Primary Examiner*—Allan R. Kuhns
*Attorney, Agent, or Firm*—W. Wayne Liauh

[57] ABSTRACT

A method for making continuous fiber-reinforced plastic composites is disclosed. It involves the steps of (a) using an extruder to continuously extrude a first plastic resin through an extruder die to form a first plastic resin layer; (b) continuously pulling a plurality of prepreg strips along with the first plastic resin layer; and (c) combining the plurality of prepreg strips with the first plastic resin layer to form a sandwiched composite containing at least two prepreg layers separated by the first plastic resin. The prepreg strip contains reinforcing fibers impregnated with a second plastic resin. The fiber-reinforced and sandwich-structured plastic composites exhibit greatly improved flexural strength and flexural modulus approaching those of real wood, and can be drilled, nailed, chiseled, saw, etc, similar to natural wood.

11 Claims, 5 Drawing Sheets

METHOD OF MAKING CONTINUOUS GLASS FIBER-REINFORCED THERMOPLASTIC FOAM SANDWICH COMPOSITES

FIELD OF THE INVENTION

The present invention relates to a process for making continuous fiber-reinforced plastic foam plates and the sandwich-structured composites made therefrom. More specifically, the present invention relates to a process for making continuous fiber-reinforced and sandwich-structured plastic composites, which exhibit greatly improved flexural strength and flexural modulus approaching those of real wood, and can be drilled, nailed, chiseled, saw, etc, similar to wood. The plastic material making up the bulk of the sandwich-structured composites can be a foamed plastic material so as to reduce the density thereof. Furthermore, the composites can comprise mainly thermoplastic materials, so that the finished product can be subject to further fabrication. The use of thermoplastic material also greatly facilitates the recycling of spent products.

BACKGROUND OF THE INVENTION

Because natural wood is non-recyclable and takes long time to grow, it is always desirable to develop substitute materials, preferably plastic materials, that can take up some of the functions provided by natural wood. However, plastic materials are typically characterized by their inferior flexural strength and flexural modulus, and are thus largely considered non-ideal candidates.

The mechanical characteristics of plastic materials can be improved by combining them with fiber-reinforced materials. In U.S. Pat. No. 3,993,726, the content thereof is incorporated herein by reference, it was disclosed a method of making continuous length articles or reinforced plastic materials. Rovings of temperature resistant material were passed through a crosshead extruder to impregnate the rovings with a thermoplastic polymer under high pressure. The impregnated rovings are pulled from the extruder through a die and are cooled and shaped into a void free article.

In U.S. Pat. No. 4,439,387, the content thereof is incorporated herein by reference, it was disclosed a method of manufacturing a compound composite reinforcing structure, by which a thermoplasitc resin material is bonded to, by mixture with, a composite reinforcing structure. The composite reinforcing structure consists of fibers imbedded in a thermoplastic resin material which is formed by passing extruded plastic resin through a die which imbeds fibers. The compound composite reinforcing structure is formed by mounting a preformed composite reinforcing structure in a molding die and by injecting thermoplastic resin material into the molding die.

In U.S. Pat. No. 4,938,823, the content thereof is incorporated herein by reference, it was disclosed a pultrusion/extrusion method for manufacturing fiber reinforced plastic articles. The method disclosed in the '823 patent involves the step of pultruding a first profile through a die, followed by the step of applying a thermoplastic resin to the first profile to form a second profile bonded integrally to the first profile.

In U.S. Pat. No. 5,277,566, the content thereof is incorporated herein by reference, it was disclosed an extrusion impregnating device for the continuous production of unidirectionally fiber-reinforced polymer moldings with fiber content between 50 and 70 vol-%. The extrusion impregnating device comprises a split casing with a split jacket. The split casing has an extruder connector with a melt inlet for introducing thermoplastic material, a separable impregnating insert with an inlet nozzle for introducing fiber material into the impregnating insert, an outlet nozzle through the fiber-reinforced linear profile exits.

The above mentioned methods have provided certain improvements in the mechanical properties of the finished plastic articles. However, none of them appears to provide the solution for making artificial wood. These methods either provide only one-dimensional reinforcement, do not allow foamed plastics (thus incurring high density), do not allow simple machining (such as nailing, sawing, drilling, etc), or suffer from a combination of these shortcomings.

SUMMARY OF THE INVENTION

The primary object of the present invention is to develop a plastic composite which resembles many of the properties of natural wood. More specifically, the primary object of the present invention is to develop a process for making continuous plastic composites that are light-weight and provide improved flexural strength and flexural modulus approaching those of real wood.

The plastic composites disclosed in the present invention contain fiber-reinforcing materials arranged in a sandwiched structure. The fiber-reinforced and sandwich-structured plastic composites of the present invention can be drilled, nailed, chiseled, saw, etc, similar to wood. The plastic material making up the bulk of the sandwich-structured composites can be a foamed plastic material so as to reduce the density thereof. Unlike natural wood, however, the fiber-reinforced and sandwich-structured plastic composites of the present invention can be made to comprise mainly thermoplastic materials. In this way the finished product can be subject to further molding-type fabrications. This option is not available with natural wood. The use of thermoplastic material also greatly facilitates the recycling of spent products. Thus, the fiber-reinforced and sandwich-structured plastic composites of the present invention indeed offer certain advantageous properties over natural woods, while they can be manufactured in a highly cost-effective manner.

One of the advantages of the present invention is that the sandwich-structured plastic composites can be made continuously in a very cost-effective manner. In one preferred embodiment of the process disclosed in the present invention, a first plastic resin is extruded from an extruder which contains an extruder die. A plurality of fiber-reinforced prepreg strips are simultaneously forced through the extruder die, where the prepreg strips are combined with the first plastic resin to form a continuous sandwiched structure, with the prepreg layers being separated by a layer of the first plastic resin. The prepreg strips are provided from respective rollers disposed near the extruder. The prepreg strips contain reinforcing fibers in a second plastic resin. The reinforcing fibers can be arranged in a linear, woven, or non-woven manner, in the second, or impregnating, plastic resin.

The use of an extruder die allows the dispositions of the prepreg layers in the sandwiched structure to be varied to obtain optimum performance for different intended applications. In the simplest arrangement, the prepreg layers can be placed on the top and bottom, respectively, of the first plastic resin layer. In another arrangement, the prepreg layers can be imbedded inside the first plastic resin layer while they still maintain a spaced-apart relationship. The distance of the prepreg layers from the top and bottom surfaces can be an adjustable variable which can be optimized according to the materials used in preparing the sandwiched composite, the dimensions of the composite, and the intended applications. The use of the extruder die as disclosed in the present invention also allows more than two prepreg layers to be included in the reinforced plastic composite. For example, a third prepreg layer can be imbedded in the center of the first plastic resin layer to form a multi-sandwiched structure. The present invention also offers many other design flexibilities. The extruder die can be a crosshead die or a non-crosshead die.

In another preferred embodiment of the process disclosed in the present invention, the prepreg strips do not meet the first plastic resin in the extruder die. Rather, the prepreg strips are affixed, via a adhesive means, to the top and bottom surfaces, respectively, of the first plastic resin layer after the latter comes out of the extruder die.

In both embodiments, a skin layer can be provided on the surface of the composite. In addition to aesthetic reasons, the skin layer may further improve the flexural strength and flexural modulus of the composite.

BRIEF DESCRIPTION OF THE DRAWINGS

The present invention will be described in detail with reference to the drawing showing the preferred embodiment of the present invention, wherein.

DETAILED DESCRIPTION OF THE PREFERRED EMBODIMENT

Figure 1:
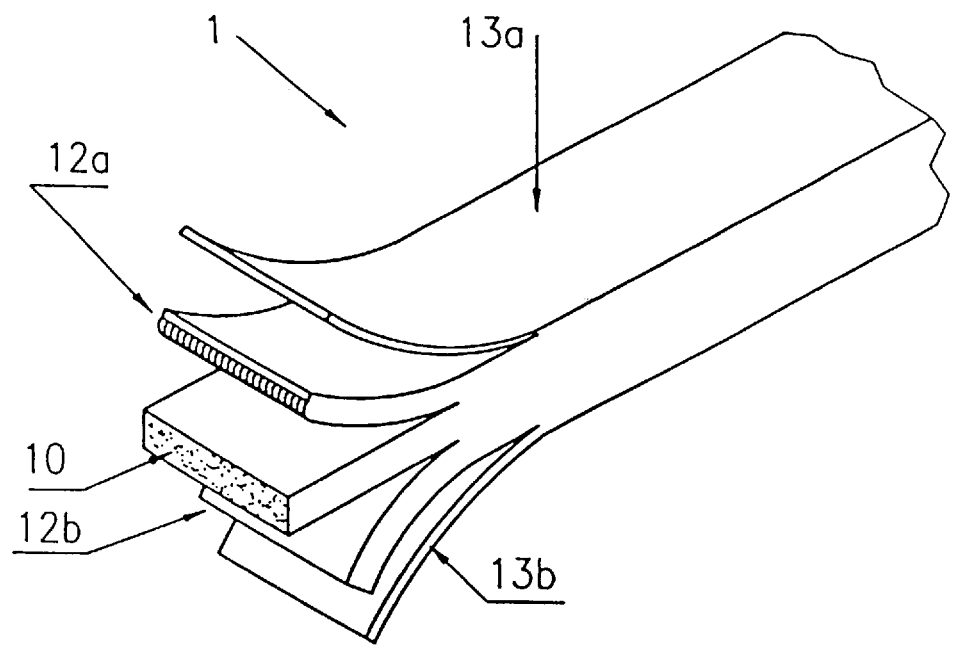
FIG. 1 is a schematic illustration of the various layers of a preferred embodiment of the fiber-reinforced and sandwich-structured plastic composite of the present invention.

The present invention discloses a novel process for making continuous fiber-reinforced and sandwich-structured plastic composites which exhibit many of the desired properties of natural wood. The fiber-reinforced and sandwich-structured plastic composites of the present invention can be made to be light-weight and provide substantially improved flexural strength and flexural modulus approaching those of real wood. They can be drilled, nailed, chiseled, saw, etc, similar to natural wood. However, unlike natural wood, the fiber-reinforced and sandwich-structured plastic composites of the present invention can be subject to further molding-type fabrications; also, they can be easily recycled. Another advantage of the present invention is that the sandwich-structured plastic composites can be made continuously in a very cost-effective manner.

In a first preferred embodiment of the process disclosed in the present invention, a first plastic resin layer, which constitutes the bulk, or "base", of the composite, is extruded from an extruder containing an extruder die. A plurality of fiber-reinforced prepreg strips are simultaneously forced through the extruder die, where the prepreg strips are combined with the first plastic resin to form a continuous sandwiched structure, with the prepreg layers being separated by a layer of the first plastic resin. The first plastic resin can be foamed or non-foamed. A foamed plastic resin causes the density of the final composite to be reduced. The first plastic resin also can be either a thermoplastic or a thermosetting resin. The use of a thermoplastic resin allows secondary moldability and facilitates plastic recycling process. The extruder die can be a crosshead die or a non-crosshead die.

The prepreg strips contain reinforcing fibers impregnated with a second plastic resin. The reinforcing fibers can be arranged in a linear, woven, or non-woven manner, or a mixture thereof. The second plastic resin also can be either a thermoplastic or a thermosetting resin. The reinforcing fibers can be carbon fiber, glass fiber, or organic fibers. They are impregnated with the second plastic resin to form the reinforcing prepreg strips.

During the manufacturing process, the prepreg strips are provided from respective rollers disposed near the extruder. The prepregs are pulled through the extruder die, where the prepreg strips are combined with the first plastic resin to form a continuous sandwiched structure. The use of an extruder die allows the dispositions of the prepreg layers in the sandwiched structure to be varied to obtain optimum performance for different intended applications. In the simplest arrangement, the prepreg layers can be placed on the top and bottom, respectively, of the first plastic resin layer. In another arrangement, the prepreg layers can be imbedded inside the first plastic resin layer while they still maintain a space-apart relationship.

The distance of the prepreg layers from the top and bottom surfaces can be adjusted according to the materials used in preparing the sandwiched composite, the dimensions of the composite, and the intended applications, in order to achieve optimum performance. The use of the extruder die as disclosed in the present invention also allows more than two prepreg layers to be included in the reinforced plastic composite. For example, a third prepreg layer can be imbedded in the center of the first plastic resin layer to form a multi-sandwiched structure. The present invention also offers many other design flexibilities. For example, by using various extruder die designs, the plastic composites of the present invention can be made to assume a plate-shape, an L-shape, an "I"-shape, or a bar-shape, etc. And they can be advantageously used in making truck beds, system molds, hockey sticks, etc.

In another preferred embodiment of the process disclosed in the present invention, the prepreg strips do not meet the first plastic resin in the extruder die. Rather, the prepreg strips are affixed, via a adhesive means, to the top and bottom surfaces, respectively, of the first plastic resin layer after the latter comes out of the extruder die. In either embodiment, a skin layer can be provided on the surface of the composite. In addition to aesthetic reasons, the skin layer may further improve the flexural strength and flexural modulus of the composite. The skin layer can be preferably made of polystyrene.

Figure 2:
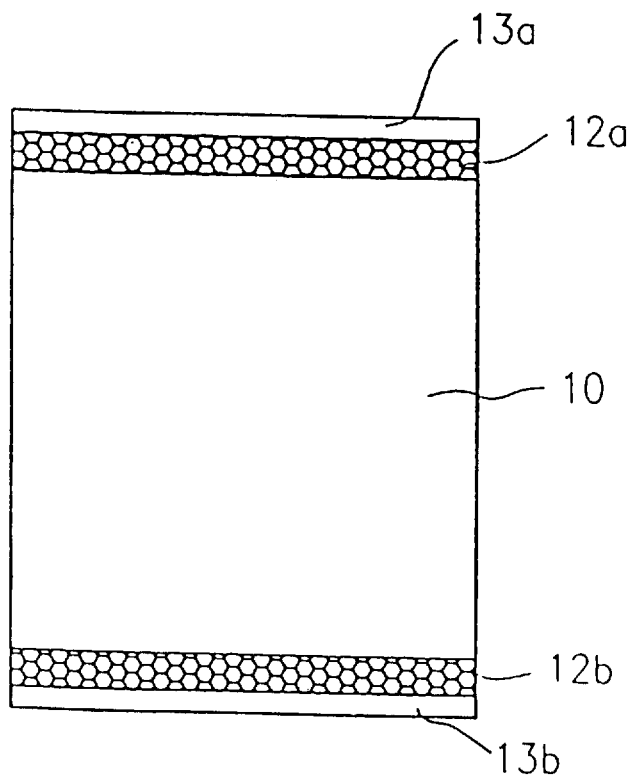
FIG. 2 is a schematic cross-sectional view of the fiber-reinforced and sandwich-structured plastic composite as shown in FIG. 1.

FIG. 1 shows a schematic illustration of the various layers of an embodiment of the fiber-reinforced and sandwich-structured plastic composite 1 of the present invention. And the companion FIG. 2 shows a schematic cross-sectional view of the fiber-reinforced and sandwich-structured plastic composite as shown in FIG. 1. The fiber-reinforced and sandwich-structured plastic composite 1 comprises a first plastic resin layer 10, which is sandwiched between a top prepreg layer 12a and a bottom prepreg layer 12b. A pair of skin layers 13a and 13b are provided at the top and bottom surfaces, respectively, of the plastic composite 1. As discussed above, the dispositions of the prepreg layers can be adjusted. Also, more then two prepreg layers can be provided in the plastic composite. Preferably, the skin layer has a thickness of about 0.2 to 1.0 mm.

The present invention will now be described more specifically with reference to the following examples. It is to be noted that the following descriptions of examples, including the preferred embodiment of this invention, are presented herein for purposes of illustration and description, and are not intended to be exhaustive or to limit the invention to the precise form disclosed.

EXAMPLE 1

Figure 3:
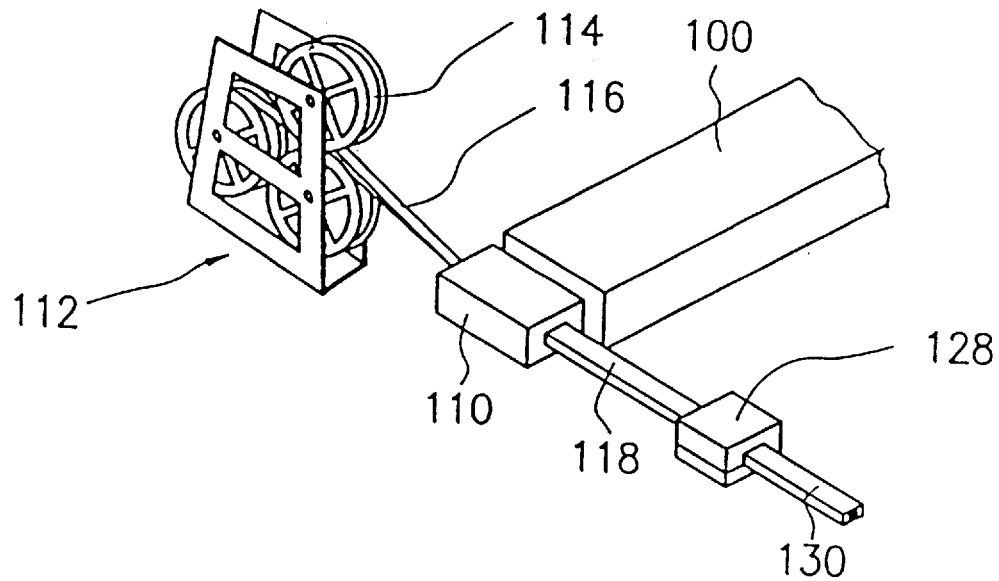
FIG. 3 is an illustrative perspective view of the first embodiment of the combined extruder-roller equipment for practicing the process disclosed in the present invention.
Figure 9:
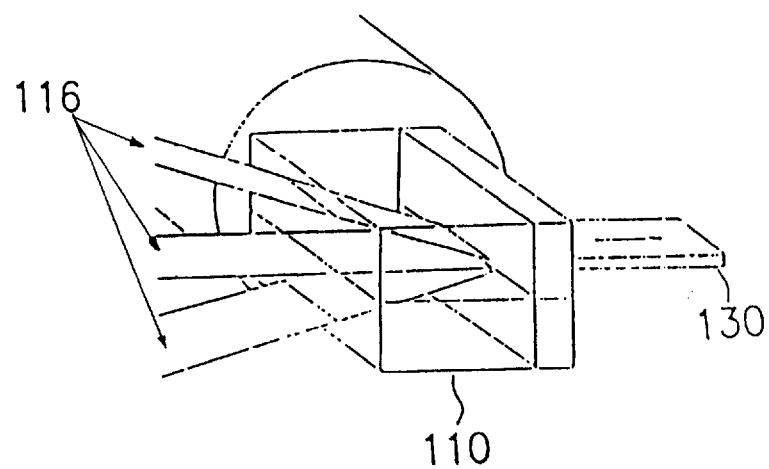
FIG. 9 is an illustrative revealed view of an embodiment of the cross-head die for combining fiber-reinforced prepregs with a plastic resin to form a sandwiched plastic composite of the present invention as shown in FIGS. 3 and 4.
Figure 10A:
FIG. 10A–E show illustrative cross-section views of five example plastic plates, including a comparative plastic plate which does not contain any of the sandwiching fiber-reinforcing layers disclosed in the present invention.
Figure 10B:
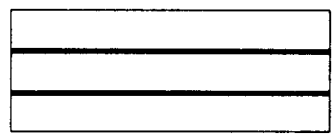
Figure 10C:
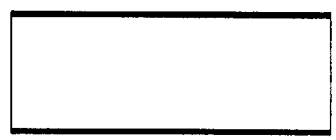
Figure 10D:
Figure 10E:
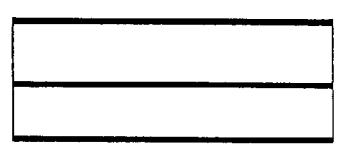

FIG. 3 is an illustrative perspective view of the first embodiment of the combined extruder-roller equipment for practicing the process disclosed in the present invention. In FIG. 3, it is shown an extruder 100, a prepreg supply 112 containing a plurality of rollers 114. A (first) plastic resin is extruded from the extruder 100 into a crosshead extruder die 110. A plurality of prepreg strips 116, each containing reinforcing fibers impregnated with a (second) plastic resin, are pulled from the rollers 114. The prepreg strips are combined with the first plastic resin in the crosshead extruder die 110 to form a sandwiched structure. FIG. 9 is an illustrative revealed view of the extruder die 110 for combining the fiber-reinforced prepregs with the first plastic resin. The embodiment as shown in FIG. 9 shows a plastic composite containing three of the prepreg layers, disposed at the top, center, and bottom, respectively, of the first plastic resin. Other arrangement of the prepregs are possible. The prepreg layers are firmly bonded with the first plastic resin at the extruder die under heat to form a sandwiched intermediate structure 118. After cooling in a shaping mold 128, the final product of sandwich-structured and fiber-reinforced plastic composite 130 is obtained. The use of the crosshead extruder die allows the placement one or more of the inner prepreg layers. The crosshead extruder die can be designed to assume other shapes, including the plate shape, L-shape, I-shape, bar-shape, etc. The plastic resins can be foamed or non-foamed resins; they can also be either thermoplastic or thermosetting resins.

EXAMPLE 2

Figure 4:
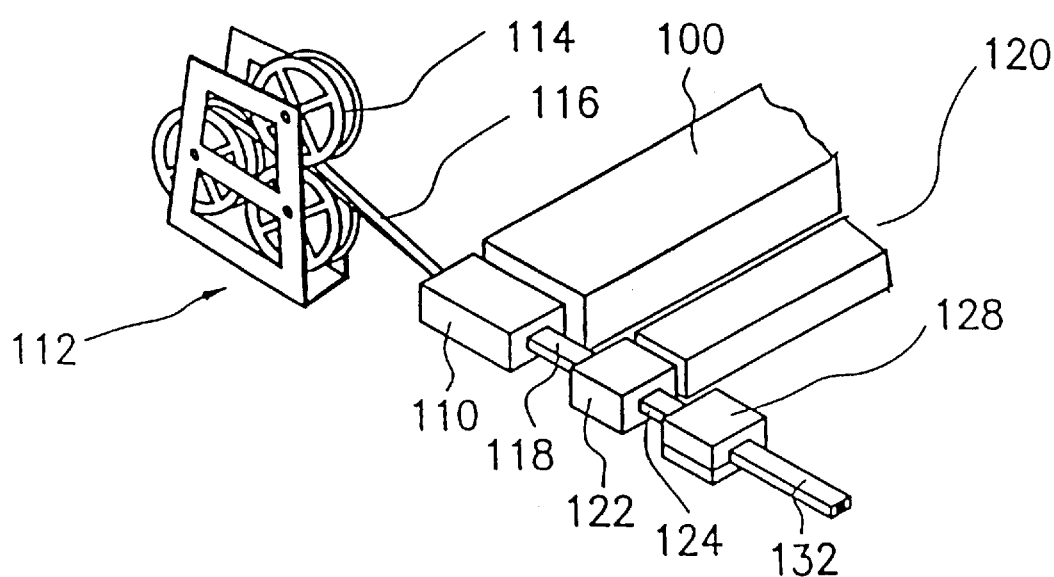
FIG. 4 is an illustrative perspective view of the second embodiment of the combined extruder-roller equipment for practicing the process disclosed in the present invention.

FIG. 4 is an illustrative perspective view of the second embodiment of the combined extruder-roller equipment for practicing the process disclosed in the present invention. In FIG. 4, it is shown an extruder 100, a prepreg supply 112 containing a plurality of rollers 114, and a second, or skin layer, extruder 120. A first plastic resin is extruded from the extruder 100 into a crosshead extruder die 110. A plurality of prepreg strips 116, each containing reinforcing fibers impregnated with a second plastic resin, are pulled from the rollers 114. The prepreg strips are combined with the first plastic resin at the crosshead extruder die 110 to form a sandwiched structure. The prepreg layers are firmly bonded with the first plastic resin at the extruder die under heat to form a sandwiched intermediate structure 118. A skin layer material, which is typically polystyrene, is extruded from the second extruder 120 into a second extruder die 122, where a skin layer is placed on the top and bottom of the sandwiched intermediate structure 118 to form a second intermediate 124. After cooling in a shaping mold 128, the final product of sandwich-structured and fiber-reinforced plastic composite containing skin layers 132 is obtained. The sandwich-structured and fiber-reinforced can be designed to assume other shapes, including the plate shape, L-shape, I-shape, bar-shape, etc. The plastic resins can be foamed or non-foamed resins; they can also be either thermoplastic or thermosetting resins.

EXAMPLE 3

Figure 5:
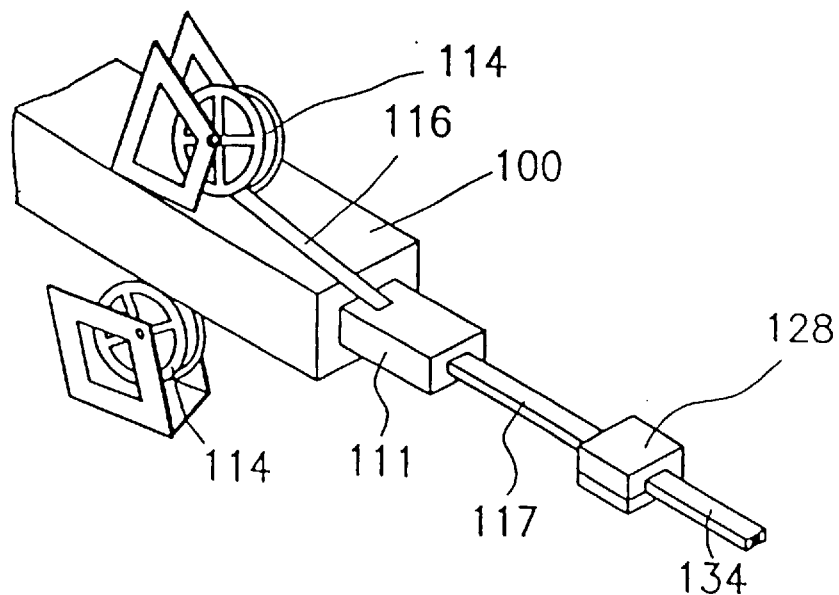
FIG. 5 is an illustrative perspective view of the third embodiment of the combined extruder-roller equipment for practicing the process disclosed in the present invention.

FIG. 5 is an illustrative perspective view of the third embodiment of the combined extruder-roller equipment for practicing the process disclosed in the present invention. In FIG. 5, it is shown an extruder 100, a pair of rollers 114 placed above and below, respectively, the extruder 100. A first plastic resin is extruded from the extruder 100 into a non-crosshead extruder die 111. A pair of prepreg strips, each containing reinforcing fibers impregnated with a second plastic resin, are pulled from the rollers 114. The prepreg strips 116 are placed at the top and bottom, respectively, of the first plastic resin in the non-crosshead extruder die 111 to form a sandwiched structure. The prepreg layers are firmly bonded with the first plastic resin under heat to form a sandwiched intermediate structure 117. After cooling in a shaping mold 128, the final product of sandwich-structured and fiber-reinforced plastic composite which does not contain skin layers 134 is obtained. The sandwich-structured and fiber-reinforced can be designed to assume other shapes, including the plate shape, L-shape, I-shape, bar-shape, etc. The plastic resins can be foamed or non-foamed resins; they can also be either thermoplastic or thermosetting resins.

EXAMPLE 4

Figure 6:
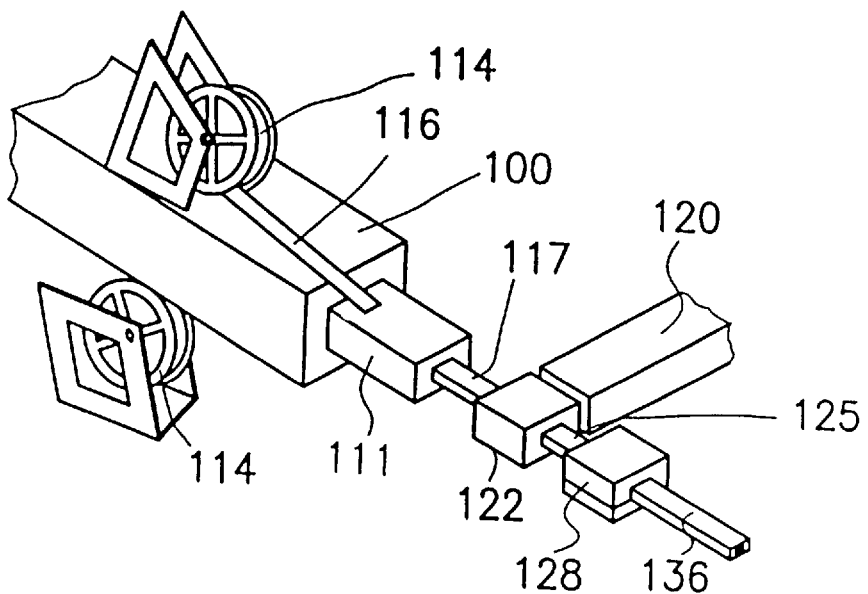
FIG. 6 is an illustrative perspective view of the fourth embodiment of the combined extruder-roller equipment for practicing the process disclosed in the present invention.

FIG. 6 is an illustrative perspective view of the fourth embodiment of the combined extruder-roller equipment for practicing the process disclosed in the present invention. In FIG. 6, it is shown an extruder 100, a pair of rollers 114 placed on top and bottom, respectively of the extruder 100, and a second, or skin layer, extruder 120. A first plastic resin is extruded from the extruder 100 into a non-crosshead extruder die 111. A pair of prepreg strips, each containing reinforcing fibers impregnated with a second plastic resin, are pulled from the rollers 114. The prepreg strips 116 are placed at the top and bottom, respectively, of the first plastic resin in the non-crosshead extruder die 111 to form a sandwiched structure. The prepreg layers are firmly bonded with the first plastic resin under heat to form a sandwiched intermediate structure 117. A skin layer material, which is typically polystyrene, is extruded from the second extruder 120 into a second extruder die 122, where a skin layer is placed on the top and bottom of the sandwiched intermediate structure 117 to form a second intermediate 125. After cooling in a shaping mold 128, the final product of sandwich-structured and fiber-reinforced plastic composite containing skin layers 136 is obtained. The sandwich-structured and fiber-reinforced can be designed to assume other shapes, including the plate shape, L-shape, I-shape, bar-shape, etc. The plastic resins can be foamed or non-foamed resins; they can also be either thermoplastic or thermosetting resins.

EXAMPLE 5

Figure 7:
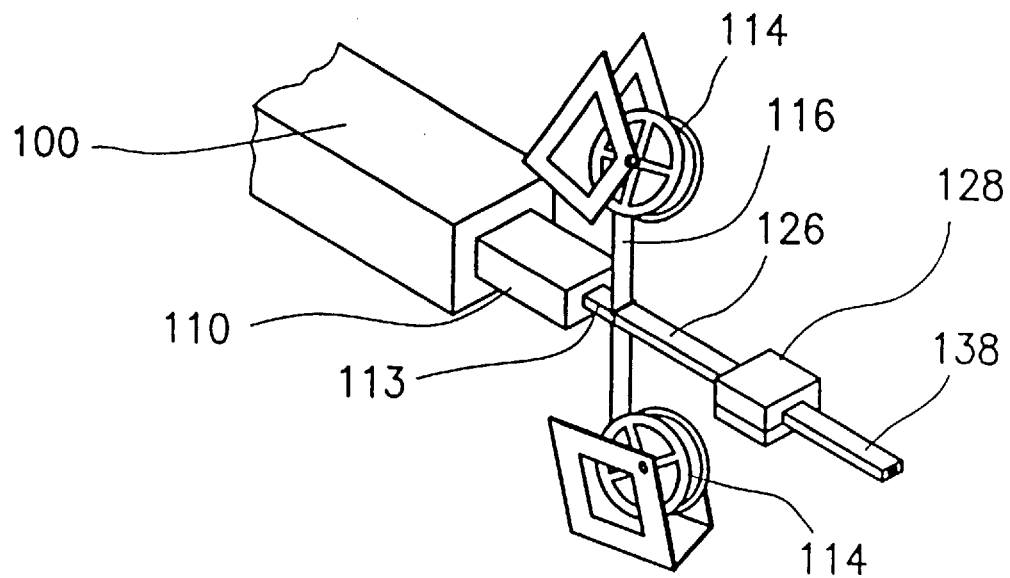
FIG. 7 is an illustrative perspective view of the fifth embodiment of the combined extruder-roller equipment for practicing the process disclosed in the present invention.

FIG. 7 is an illustrative perspective view of the fifth embodiment of the combined extruder-roller equipment for practicing the process disclosed in the present invention. In FIG. 7, it is shown an extruder 100 and a pair of rollers 114. A first plastic resin is extruded from the extruder 100 into an extruder die 110. A pair of prepreg strips 116, each containing reinforcing fibers impregnated with a second plastic resin, are pulled from the rollers 114, which are placed between the extruder die 110 and the shape mold 128. The prepreg strips are affixed at the top and bottom, respectively, of the first plastic resin layer 113 after it is extruded from the extruder die 110 to form a sandwiched structure. The prepreg layers are firmly bonded with the first plastic resin vis an adhesive force to form a sandwiched intermediate structure 126. After cooling in a shaping mold 128, the final product of sandwich-structured and fiber-reinforced plastic composite without skin layers 138 is obtained. The sandwich-structured and fiber-reinforced can be designed to assume other shapes, including the plate shape, L-shape, I-shape, bar-shape, etc. The plastic resins can be foamed or non-foamed resins; they can also be either thermoplastic or thermosetting resins. With this embodiment, the reinforcing prepregs can only be placed at the top and bottom of the composites.

EXAMPLE 6

Figure 8:
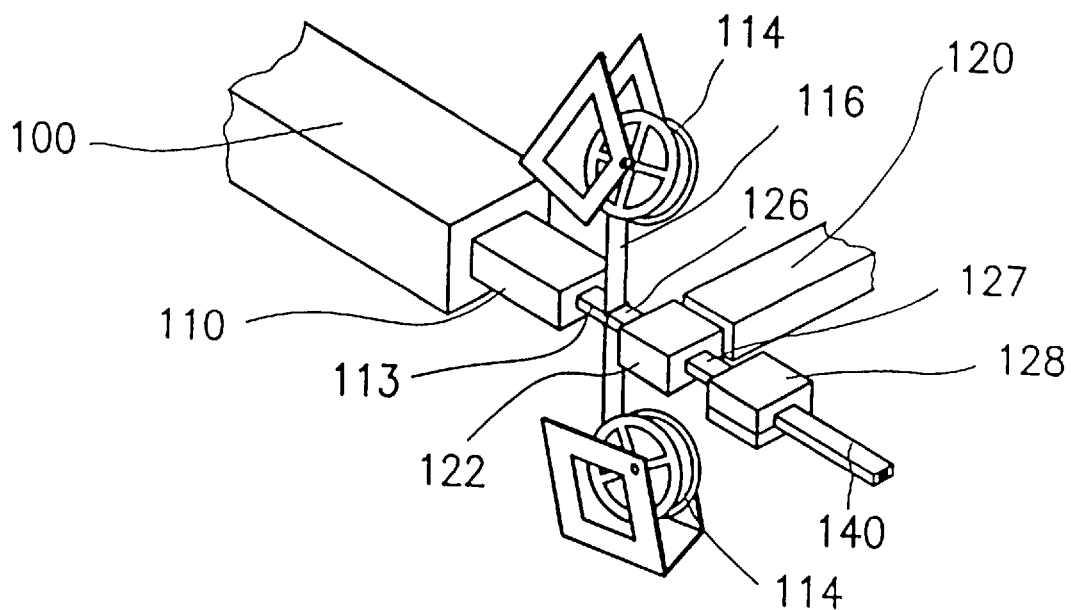
FIG. 8 is an illustrative perspective view of the sixth embodiment of the combined extruder-roller equipment for practicing the process disclosed in the present invention.

FIG. 8 is an illustrative perspective view of the sixth embodiment of the combined extruder-roller equipment for practicing the process disclosed in the present invention. In FIG. 8, it is shown an extruder 100, a pair of rollers 114, and a second, or skin layer, extruder 120. A first plastic resin is extruded from the extruder 100 into an extruder die 110. A pair of prepreg strips 116, each containing reinforcing fibers impregnated with a second plastic resin, are pulled from the rollers 114, which are placed between the extruder die 110 and the second extruder 120. The prepreg strips are affixed at the top and bottom, respectively, of the first plastic resin layer 113 after it is extruded from the extruder die 110 to form a sandwiched structure. The prepreg layers are firmly bonded with the first plastic resin vis an adhesive force to form a sandwiched intermediate structure 126. A skin layer material is extruded from the second extruder 120 into a second extruder die 122, where a skin layer is placed on the top and bottom of the sandwiched intermediate structure 126 to form a second intermediate 127. After cooling in a shaping mold 128, the final product of sandwich-structured and fiber-reinforced plastic composite containing skin layers 140 is obtained. The sandwich-structured and fiber-reinforced can be designed to assume other shapes, including the plate shape, L-shape, I-shape, bar-shape, etc. The plastic resins can be foamed or non-foamed resins; they can also be either thermoplastic or thermosetting resins. With this embodiment, the reinforcing prepregs can only be placed at the top and bottom of the composites.

EXAMPLES A–E

Five plastic plates, each with a width of about 50 mm and a thickness of about 6.5 mm were prepared and designated as Examples A–E. Example A is a comparative example containing foamed polystyrene without the reinforcing layers. Example B is a reinforced composite containing two reinforcing layers (shown as heavy solid lines) that are imbedded inside the polystyrene foam, at about one-third of the thickness from the top of bottom. Example C is similar to Example B, except that the reinforcing layers are disposed at the top and bottom, respectively, of the polystyrene foam. Example D is similar to Example C, except that it contains a pair of skin layers (shown as heave dotted lines) at the top and bottom surfaces, respectively, of the plastic composite. Example E is similar to Example C, except that it contains a third reinforcing layer disposed at the center of the polystyrene foam. FIG. 10A–E show illustrative cross-section views of these plastic sheets, respectively. All these examples were prepared using the extruder-roller combination as described in Example 1. The reinforcing layer had a thickness of about 0.5 mm, and the skin layer had a thickness of about 0.25 mm.

The five plastic sheets were tested to measure their physical and mechanical properties. Their bulk densities were 0.80, 1.05, 0.90, 1.03, and 0.80 g/cm$^3$, respectively; plastic densities were 0.80, 0.90, 0.84, 0.88, and 0.61 g/cm$^3$, respectively. The glass fiber contents of these plastic sheets were 0, 17.1, 20.5, 19.8, 31.0%, respectively. The flexural strengths of these plastic sheets were measured to be 270, 980, 610, 910, and 580 Kgf/cm$^2$, respectively, and the flexural modulus were 12,300, 35,500, 80,000, 103,700, and 53,900 Kgf/cm$^2$, respectively. The measured results are summarized in Table 1, along with the test results of several natural wood samples. The test results show that with the present invention, the flexural strength can be increased by a factor of about 3.5, and the flexural modulus can be improved by almost ten-fold.

TABLE 1

| Samples | Bulk Density g/cm$^3$ | Plastic Density g/cm$^3$ | Fiber Content (wt %) | Flexural Strength (kgf/cm$^3$) | Flexural Modulus (kgf/cm$^3$) |
|---|---|---|---|---|---|
| Sample A | 0.80 | 0.80 | 0.0 | 270 | 12,300 |
| Sample B | 1.05 | 0.90 | 17.1 | 980 | 35,500 |
| Sample C | 0.90 | 0.84 | 20.5 | 610 | 80,000 |
| Sample D | 1.03 | 0.88 | 19.8 | 910 | 103,700 |
| Sample E | 0.80 | 0.61 | 31.0 | 580 | 53,900 |
| Wood A | 0.43 | — | — | 660 | 51,000 |
| Wood B | 0.72 | — | — | 1,160 | 98,000 |
| Wood C | 0.97 | — | — | 1,780 | 112,000 |

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for making continuous fiber-reinforced plastic composites comprising the steps of:

(a) using an extruder to continuously extrude a first plastic resin through an extruder die to form a first plastic resin layer, and continuously pulling said first plastic resin layer in a first direction;

(b) continuously pulling a plurality of prepreg strips in said first direction; and (c) combining said plurality of prepreg strips with said first plastic resin layer to form a sandwiched composite containing at least two prepreg layers separated by said first plastic resin, wherein said prepreg strip contains reinforcing fibers impregnated with a second plastic resin;

(d) wherein said plurality of prepreg strips are combined with said first plastic resin layer in said extruder die.

2. The method for making continuous fiber-reinforced plastic composites according to claim 1 wherein said first plastic resin is a foamed plastic resin.

3. The method for making continuous fiber-reinforced plastic composites according to claim 1 wherein said steps (b) and (c) comprise the step of pulling and combining two of said prepreg strips with said first plastic resin layer.

4. The method for making continuous fiber-reinforced plastic composites according to claim 1 wherein said prepreg strips are placed at the top and bottom, respectively, of said first plastic resin layer.

5. The method for making continuous fiber-reinforced plastic composites according to claim 1 which further comprises the step of placing at least a skin layer on an exterior surface of said sandwiched composite.

6. The method for making continuous fiber-reinforced plastic composites according to claim 1 wherein said extruder die is a crosshead die.

7. The method for making continuous fiber-reinforced plastic composites according to claim 6 wherein said prepreg strips are pulled in such a manner that at least one of said prepreg players is imbedded in said first plastic resin layer.

8. The method for making continuous fiber-reinforced plastic composites according to claim 6 wherein three or more of said prepreg strips are pulled into said first plastic resin layer and each prepreg layer being spaced apart from other prepreg layers.

9. The method for making continuous fiber-reinforced plastic composites according to claim 6 wherein said prepreg strips are pulled in such a manner that one of said prepreg layer is placed at or near the center of said first plastic resin layer.

10. The method for making continuous fiber-reinforced plastic composites according to claim 1 wherein said extruder die is a non-crosshead die.

11. The method for making continuous fiber-reinforced plastic composites according to claim 6 wherein said first plastic resin is a foamed plastic resin.

* * * * *